United States Patent [19]

Walton

[11] 4,418,462

[45] Dec. 6, 1983

[54] METHOD OF ASSEMBLING AND DISASSEMBLING A CONTROL COMPONENT STRUCTURE

[75] Inventor: Lewis A. Walton, Lynchburg, Va.

[73] Assignee: The Babcock & Wilcox Company, New Orleans, La.

[21] Appl. No.: 277,553

[22] Filed: Jun. 26, 1981

Related U.S. Application Data

[62] Division of Ser. No. 952,522, Oct. 18, 1978, abandoned.

[51] Int. Cl.³ .............................................. B23P 19/00
[52] U.S. Cl. ................................... 29/426.4; 29/426.5
[58] Field of Search ................... 411/501, 502; 29/509, 29/523, 426.5, 157.4, 426.4; 176/78; 92/208; 376/353, 239, 224, 440, 445, 446

[56] References Cited

U.S. PATENT DOCUMENTS

| | | | |
|---|---|---|---|
| 3,163,094 | 12/1964 | Riedhammer et al. | 92/208 |
| 3,475,273 | 10/1967 | Krawiec | 176/78 |
| 3,787,945 | 1/1974 | Pasek et al. | 29/157.4 |
| 3,842,710 | 10/1974 | Poupitch | 29/509 |
| 3,913,921 | 10/1975 | Hawkins | 29/523 |
| 4,152,206 | 5/1979 | Jabsen | 176/78 |

Primary Examiner—Ervin M. Combs
Assistant Examiner—Steven E. Nichols
Attorney, Agent, or Firm—Robert J. Edwards; J. Henry Muetterties

[57] ABSTRACT

A technique is provided for engaging and disengaging burnable poison rods from the spider in a fuel assembly. The cap on the end of each of the burnable poison rods is provided with a shank that is received in the respective bore formed in the spider. In one illustrative embodiment, the shank is deformed to firmly secure the rod and attached shank in the spider bore. Pressing the shank in the direction of the bore axis overcomes the deformation to release the particular rod from the spider.

5 Claims, 4 Drawing Figures

METHOD OF ASSEMBLING AND DISASSEMBLING A CONTROL COMPONENT STRUCTURE

This application is a division of application Ser. No. 952,522, filed Oct. 18, 1978 abandoned.

TECHNICAL FIELD

This invention is directed to improvements in nuclear reactor fuel assemblies, and, more particularly, to methods and apparatus for securing and removing burnable poison rods from the spider in a fuel assembly, and the like.

BACKGROUND ART

To produce useful power from nuclear processes it is necessary to assemble a sufficient concentration of fissionable uranium, or other suitable material, in a physical configuration that will sustain a continuous sequence of energy-producing reactions. This assembly, or reactor core, transfers the heat that is generated in the fission reactions to a working fluid. Frequently, pressurized water flowing through the core at high velocities is used for this purpose.

Because the heat, vibration and radiation that is generated within a power reactor core creates a generally hostile environment, the structural integrity of the core components is an important consideration. Consequently, pressurized water power reactor cores frequently are comprised of groups of fuel assemblies that are arranged in a generally right circular cylindrical configuration. Each fuel assembly, moreover usually comprises an array of about two hundred long slender fuel rods that are parallel to and spaced from each other. Each of these fuel rods contains a stack of generally cylindrical uranium dioxide pellets in which the uranium provides the fissionable fuel for the power reactor.

These fuel assemblies are not limited to fuel rods but also support a number of other components. For example, instrumentation tubes for observing temperature and neutron flux conditions within the core; end fittings and fuel element grids for stabilizing the fuel assembly components; and control rods and control rod guide tubes for regulating the power output from the reactor through the selective absorption of fission inducing neutrons within the reactor core often are made a part of the fuel assembly structure.

Clearly, the neutron distribution will vary from place-to-place within the reactor core. Illustratively, near the core perimeter it can be expected that the neutron population will be small relative to the center of the reactor core because the concentration of neutron producing uranium is lower at the core perimeter than it is in the center of the core. Neutrons at the core perimeter can "escape" from the core more readily through the core surface than they can from the center of the core, further tending to reduce the neutron concentration near the reactor core surface. Because heat generation within any specific portion of the reactor core is related to the neutron population within that portion, there is a definite tendency to produce higher temperatures at the center of the reactor core than at its margin. This inclination toward producing local temperature maxima in different regions within the reactor core is generally undesirable for a number of reasons. Primarily, the reactor is designed for core operation that will not exceed a predetermined temperature. If this core temperature is reached in just one or in a few local points within the reactor core, the overall heat generating potential of the core can not be realized. This effect results because the temperatures elsewhere in the core must be kept to lower values in order not to exceed the design temperature at those limited points or "hot spots" in which the maximum design temperature has been reached.

Accordingly, in the simplified example under consideration, over-all reactor power can be increased if the neutron population (and hence, heat) in the central portion of the core is depressed and the neutron population in the larger volume that characterizes the peripheral reactor core annulus is allowed to increase. In this way, by "flattening" the power distribution in the reactor core, the core actually is able to generate more power than it would be able to generate if the neutron concentration, temperature and power was allowed to reach a peak in the center of the core, or in some other location, as the case may be. In order to achieve this "flat" power distribution, it has been the practice to insert "burnable poison" rods in the fuel assemblies. Typically, a burnable poison rod is a tube filled with a material that has a very high probability for absorbing neutrons. For example, a sintered dispersion of boron carbide in an alumina matrix is suitable for this purpose.

Neutrons, absorbed in this manner by means of the material within the rod are, in effect, withdrawn from the fission and power generation process. And so, to "flatten" the power distribution with a reactor core, burnable poison rods are concentrated in those fuel assemblies that are located in the central portion of the reactor core.

Depending on a number of subtle effects it also might be advisable to provide burnable poison rod concentrations in other portions of the reactor core in which specific design or operational features produce large local neutron populations.

Not only must the fuel assembly support all of these diverse structural components in spite of the generally hostile environment within a reactor core, but the fuel assembly also must be capable of the somewhat conflicting need for swift and easy disassembly. For instance, it should be noted that fuel assemblies become radioactive after exposure in an operating reactor core. This radiation is so intense that inspection and repair can be accomplished only with remote handling equipment behind adequate radiation shielding.

Consequently, because disassembly procedures are expensive and time consuming, the need for a sturdy, yet readily dismountable structure is of considerable commercial importance.

The burnable poison rods that are used in many fuel assemblies are a part of this structural picture. Generally, the burnable poison rods that have characterized the prior art are mounted for movement in a direction that is parallel to the longitudinal orientation of the fuel rods. A "spider," in the form of a centrally disposed hub from which a number of arms radiate often is used to couple the burnable poison rods together for longitudinal movement relative to the balance of the fuel assembly. This motion is required to permit the power reactor operator to insert or withdraw the burnable poison rods from the reactor core in response to power flattening needs.

Eventually, lumped burnable poison rods must be removed from operation, packaged in a cask that provides adequate radiation shielding and then shipped for disposal at a suitable site. It is desirable to remove each of the rods from the spider in order to economize on the volume of the shipping cask. Unfortunately, removing the burnable poison rods from the spider is complicated and potentially hazardous for a number of reasons. The irradiated poison rods have developed, after sufficient irradiation in the reactor core, an internal gas pressure. The cladding or tubing in which the burnable poison has been loaded also becomes quite brittle as a result of a period of irradiation. The burnable poison rods usually are joined to their respective spider arms by means of threaded fasteners. In these circumstances, the most frequently suggested techniques for removing the rods from the spider are by means of shearing or sawing. Sawing the rods permits these rods to be handled more gently—an important consideration in view of the gas pressure within the rods—but the sawing process generates radioactive chips. Shearing overcomes this problem to a large extent, but does nevertheless result in undesirably rough handling.

There is, then a need for some suitable means for joining burnable poison rods to the spider arms in a manner that is proof against the reactor core environment but permits these rods to be removed from the spider simply, swiftly and delicately.

SUMMARY OF THE INVENTION

These and other problems that have beset the prior art are overcome through the practice of the invention. More specifically, a pin is secured to one of the transverse ends of a burnable poison rod. The pin is seated in a bore that is formed in the spider arm appropriate to the rod under consideration. Suitable means are provided for securing the rod to the spider arm. Illustratively, upsetting the end of the pin to secure the pin to the adjacent portion of the spider arm is suitable for this purpose.

In accordance with a salient feature of the invention, the burnable poison rod is separated from the spider arm by applying a force in a direction that is coincident with the longitudinal axis of the rod and its associated pin. The force is of sufficient magnitude to press the pin out of the spider arm. Typically, the longitudinal force presses the upset portion against the spider arm and, essentially extrudes the upset portion of the pin through the bore in the spider arm that houses the pin.

In these circumstances, although considerable force may be applied to press the pin through the spider arm bore, it will be noted that the force is applied in a longitudinal direction relative to the pin. This feature of the invention not only protects the brittle, pressurized burnable poison rod from risk of fracture or other damage due to the rough handling that characterizes shearing but also avoids producing a mass of radioactive chips if the rod is to be sawed free from the spider.

There are a number of more subtle advantages that accrue through the practice of the invention. Manufacturing costs, for example, are relatively low in comparison to the threaded fasteners that have characterized the prior art. Joint performance, moreover, is superior at the temperatures commonly reached within nuclear reactor cores. For instance, the greater thermal expansion of the spider arm (frequently made from stainless steel) relative to the Zircaloy pin on the burnable poison end plug causes undesirable axial stress that must be compensated for by other means. This is achieved in the invention by a corresponding radial loosening, thereby reducing the chance for generating undesirable thermal stresses in this region. Without this automatically provided stress relief, these thermally induced forces otherwise might cause the pin to shear and thus permit the burnable poison rod to become an undesirable loose object within the reactor core.

The various features of novlety which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
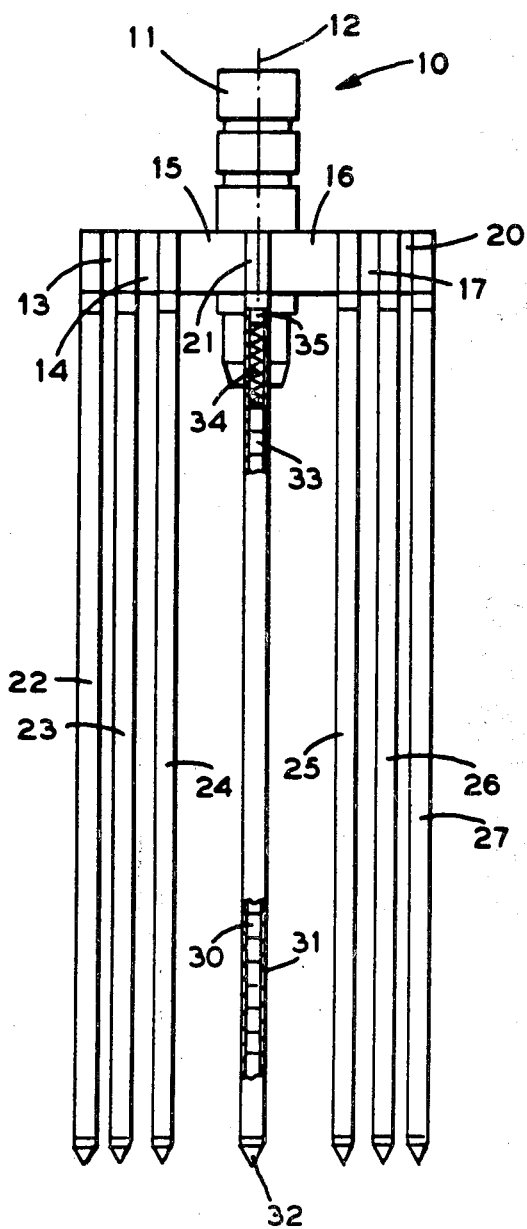
FIG. 1 shows a typical spider and burnable poison rod combination.

For a more detailed understanding of the invention, attention is invited to FIG. 1. As illustrated, a spider 10, formed from stainless steel, or the like, is provided with a centrally disposed, generally cylindrical hub 11 that has a longitudinal axis 12. The spider 10 has a number of spider arms that extend radially from the hub 11 in a plane that is perpendicular to the axis 12. For purposes of simplified description, only spider arms 13, 14, 15, 16, 17, 20 and 21 which are viewed in the plane of of FIG. 1 of the drawing are shown.

A group of burnable poison rods 22, 23, 24, 25, 26, 27 and 30 are attached to their respective spider arms. All of these burnable poison rods are long, slender tubes in which the longitudinal axis of each of these tubes is parallel with the longitudinal axis 12 of the hub 11. As illustrated in more detail with respect to the burnable poison rod 30, a hollow tube 31 forms the outer surface of the rod. On longitudinal end of the tube 31 is sealed by means of a solid plug 32 that is welded or otherwise secured in the open tube end. Within the tube 31 and bearing against the plug 32 is a stack of short cylindrical burnable poison pellets 33. The individual cylindrical pellets in the stack 33 are pressed together in a longitudinal direction by means of a spring 34 which is lodged between the last pellet in the stack 33 and a plug 35 that is secured in the other open end of the hollow tube 31.

Figure 3:
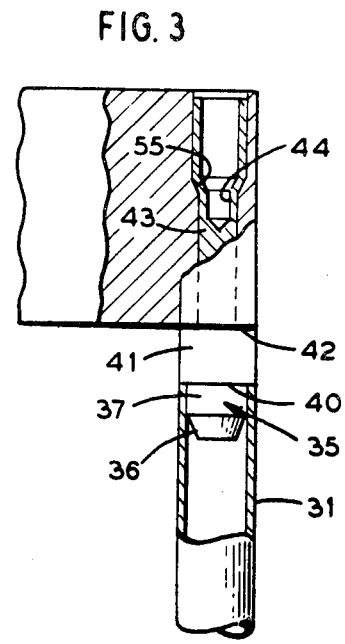
FIG. 3 shows in broken section a pin installation in a portion of a spider that characterizes features of the invention.

Turning now to FIG. 3, it can be seen that the plug 35 is provided with a chamfered end 36 that provides a lead in for a cylindrical portion 37. The inside diameter of the hollow tube 31 matches the outside diameter of the cylindrical portion to an extent that a snug fit is achieved.

As shown in the drawing, the cylindrical portion, 37 terminates in a radially protruding shoulder 40 that engages the transverse end of the hollow tube 31 to which it is welded. In the illustrative embodiment of the invention, the diameter of the hollow tube 31 in order to establish a flush relationship between an exposed cylindrical portion 41 of the plug 35 that extends beyond the transverse end of the tube 31 and the outer surface of the tube.

A transverse flange 42 that is spaced longitudinally from the shoulder 40 terminates the exposed cylindrical portion 41 of the plug 35. A stem 43 protrudes in a longitudinal direction from the central portion of the transverse flange 42. Most of the shank that forms the stem 43 is formed from solid metal stock. A longitudinal bore 44 is formed, however, in the stem 43 for a depth that extends from the free end of the stem through a distance that is about half of the stem length.

Figure 2:
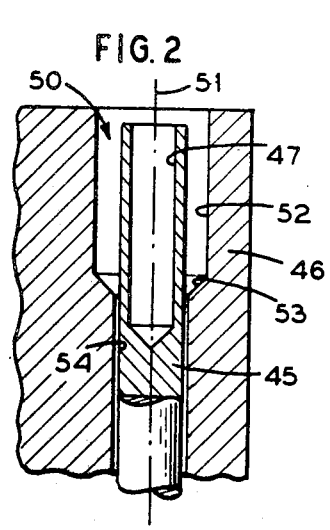
FIG. 2 illustrates in full section a typical embodiment of a portion of a pin in accordance with principles of the invention.

A portion of a stem 4 as manufactured, and before full installation on a spider arm 46, is shown in FIG. 2. Thus the stem 42 has a generally cylindrical exterior configuration. Bore 47, that extends from the free end of the stem 4 to about half its length, also is of a generally cylindrical shape with the exception of the bottom of the bore which is formed into the shape of a shallow cone.

It will be recalled that the stem 45 is received in the spider arm 46. To accomplish this end, the spider arm 46 is provided with a generally cylindrical passageway 50 that has a longitudinal axis 51 which is essentially coincident with the longitudinal axis of the stem 45 and the burnable poison rod (not shown in FIG. 2). In accordance with a characteristic feature of the invention, an enlarged recess 52 is formed within the passageway 50. Note in this respect, that the recess 52 overlaps only a portion of the bore 47 in the stem 45.

A truncated conical surface 53 affords a transition from the recess 52 to a bore 54 which forms the balance of the passageway 50. As shown in FIG. 2, the bore 54 has a slightly larger diameter than the outside diameter of the stem 45 that is lodged in the passageway 50.

In operation, the stem 45 is inserted into the appropriate passageway 50. The stem is mechanically deformed through hydroforming, mechanical flaring or other suitable means, to match the contour of the truncated conical surface 53 and the enlarged recess 52 and to provide a designed "weak point" for poison rod removal, as illustrated in FIG. 3. In this manner, the burnable poison rod is secured to the associated spider arm without making use of costly and difficult to handle weld fittings, and the like.

It will be recalled, moreover, that different metals often are used for the spider arm and for the burnable poison rod. The truncated conical surface 55, however, provides a tapered surface that alleviates the effect of the different coefficients of thermal expansion. Typically, as the temperature increases, the exemplary stainless steel spider arm expands in an axial direction more than the poison rod end plug 35 (usually Zircalloy). In this manner, the axial stresses that otherwise would have been generated are alleviated because of the radical loosening of the parts. Thus, because the spider arm also expands radially more than the plug 35, the conical interface between the adjacent deformed portion of the stem 43 and the conical surface 53 shifts axially downward. The two parts remain in intimate contact radially and axially, but the strain in the stem 45 has been materially reduced relative to the stresses that otherwise would have been generated. Thus, although a tight joint is maintained throughout the entire range of reactor operating temperatures, the structure nevertheless provides a predetermined design "weak point" to facilitate removal of the burnable poison rod as described subsequently in more complete detail.

Figure 4:
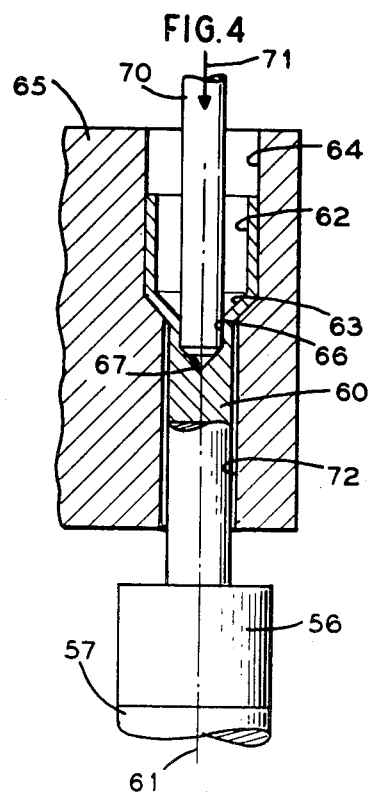
FIG. 4 is a drawing in broken section of a technique for removing burnable poison rods in a manner that further characterizes the invention.

A further salient feature of the invention is shown in FIG. 4. As illustrated, a plug 56 seals an end of a burnable poison rod 57. The plug 56 has a stem 60, the longitudinal axis of which is coincident with longitudinal axis 61 of the burnable poison rod 57.

A bore 62 extends longitudinally through about half the length of the stem 60. As shown in the drawing, this bore has been expanded or upset through about half of its length to produce an enlarged cavity that enables the outer diameter of the adjacent portion of the stem 60 to bear against an enlarged recess 64 in a spider arm 65.

The bore 62 has a truncated conical taper 63 that also provides a transition to a smaller diameter bore portion 66. The smaller diameter bore portion 66, moreover, terminates in a cone 67.

In accordance with a salient feature of the invention, a mandrel 70 is pressed into the bore 62 in the direction of arrow 71. The mandrel 70, preferably formed in the shape of a slender, cylindrical metal shaft, has a diameter that is slightly smaller than the diameter of the smaller diameter bore portion 66. The longitudinal axis of the mandrel 70 is generally coincident with the longitudinal axis 61 of the burnable poison rod 57.

To remove the burnable poison rod 57 from the spider arm 65 in a manner that will avoid undesirable shearing or sawing procedures it is only necessary to press the mandrel 70 in the direction of the arrow 71 with force sufficient to extrude the stem 60 through small diameter recess 72, thereby freeing the stem 60 from the spider arm 65.

Naturally although not shown in the drawing, a group of mandrels can be ganged together on a plate. These mandrels, aligned with and inserted into corresponding bores on respective burnable poison rods mounted in a spider, can press all of the rods out of the spider in one operation. In this way, a potentially hazardous, expensive and tedious process of shearing or sawing each burnable poison rod from the spider is avoided.

The embodiments of the invention in which an exclusive property or privilege is claimed are defined as follows:

1. A method for installing and removing a burnable poison rod having a stem protruding from one end thereof from a spider having a bore for receiving the stem comprising the steps of inserting the stem in an axial direction into the spider bore, securing the stem in the bore, pressing the stem in the axial direction with respect to the bore with sufficient force to overcome the force securing the stem in the bore, and withdrawing the stem from the bore.

2. A method according to claim 1 wherein said step of securing the stem in the bore comprises the step of deforming a portion of the stem in order to press the stem against the surface of the spider bore.

3. A method of assembling and disassembling a control component structure for a nuclear reactor comprising the steps of;

providing a spider having a plurality of arms, at least spider bore formed in said plurality of arms for receiving a burnable poison rod having a stem protruding from one end thereof, inserting the stem into the spider bore, fastening the stem within the spider bore with a securing means, separating the burnable poison rod from the spider by applying a force to the burnable poison rod and the spider sufficient to overcome the securing means while maintaining structural unity of the burnable poison rod and maintaining structural unity of the spider.

4. A method of assembling and disassembling a control component structure for a nuclear reactor comprising the steps of;

providing a spider having a plurality of arms, at least one spider bore formed in said plurality of arms for receiving a burnable poison rod having a stem protruding from one end thereof, inserting the stem in an axial direction into the spider bore, fastening the stem within the spider bore with a securing means, applying the force to the stem and the spider sufficient to overcome the securing means, and withdrawing the stem from the bore while maintaining structural unity of the poison rod and maintaining structural unity of the spider.

5. A method according to claim 3 or 4 wherein the step of fixing the stem in the spider bore with a securing means comprises the step of deforming a portion of the stem in order to press said portion of the stem against that part of the spider which defines the spider bore.

* * * * *

UNITED STATES PATENT AND TRADEMARK OFFICE
CERTIFICATE OF CORRECTION

PATENT NO. : 4,418,462
DATED : December 6, 1983
INVENTOR(S) : Lewis A. Walton

It is certified that error appears in the above-identified patent and that said Letters Patent are hereby corrected as shown below:

Column 4, line 40 delete "of"

Column 5, line 14 delete "4" and insert -- 43 --

Column 5, line 16 delete "42" and insert -- 43 --

Column 5, line 18 delete "4" and insert -- 43 --

Column 6, line 61 - 62 between " at least " and "spider" insert -- one --

Signed and Sealed this

Thirteenth Day of March 1984

[SEAL]

Attest:

GERALD J. MOSSINGHOFF

Attesting Officer  Commissioner of Patents and Trademarks